United States Patent
Wu et al.

(10) Patent No.: US 10,360,466 B2
(45) Date of Patent: Jul. 23, 2019

(54) SYSTEMS AND METHODS FOR IMAGE DESCRIPTION GENERATION

(71) Applicant: Facebook, Inc., Menlo Park, CA (US)

(72) Inventors: Shaomei Wu, Mountain View, CA (US); Lada Ariana Adamic, Mountain View, CA (US); Jeffrey C. Wieland, Mountain View, CA (US); Omid Farivar, Mountain View, CA (US); Hermes Germi Pique Corchs, London (GB); Matt King, Palo Alto, CA (US); Brett Alden Lavalla, San Carlos, CA (US); Balamanohar Paluri, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 108 days.

(21) Appl. No.: 15/391,735

(22) Filed: Dec. 27, 2016

(65) Prior Publication Data

US 2018/0181832 A1    Jun. 28, 2018

(51) Int. Cl.
*G06K 9/00*    (2006.01)
*G06K 9/20*    (2006.01)
*G06Q 30/00*    (2012.01)
*G06F 16/583*    (2019.01)
*G06N 20/00*    (2019.01)
*G06K 9/18*    (2006.01)

(52) U.S. Cl.
CPC ......... *G06K 9/2063* (2013.01); *G06F 16/583* (2019.01); *G06Q 30/00* (2013.01); *G06K 9/00288* (2013.01); *G06K 9/18* (2013.01); *G06K 2209/01* (2013.01); *G06N 20/00* (2019.01)

(58) Field of Classification Search
CPC .. G06K 9/66; G06K 9/00288; G06K 9/00751; G06K 2009/00738; G06T 2207/20081; G06T 7/44; H04N 21/466
See application file for complete search history.

(56) References Cited

U.S. PATENT DOCUMENTS

| | | | |
|---|---|---|---|
| 2001/0014897 A1* | 8/2001 | Hata | G06K 9/00442 715/255 |
| 2004/0215977 A1* | 10/2004 | Goodman | G06Q 10/107 726/22 |
| 2015/0331711 A1* | 11/2015 | Huang | G06F 3/0481 719/320 |
| 2016/0225053 A1* | 8/2016 | Romley | G06T 7/11 |

* cited by examiner

*Primary Examiner* — Euengnan Yeh
(74) *Attorney, Agent, or Firm* — Sheppard Mullin Richter & Hampton LLP (57) ABSTRACT

Systems, methods, and non-transitory computer-readable media can receive an image. One or more concepts depicted in the image are identified based on machine learning techniques. The one or more concepts are filtered based on filtering criteria to identify one or more selected concepts. An image description is generated comprising the one or more selected concepts.

20 Claims, 7 Drawing Sheets

SYSTEMS AND METHODS FOR IMAGE DESCRIPTION GENERATION

FIELD OF THE INVENTION

The present technology relates to the field of social networks. More particularly, the present technology relates to image description generation.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

User experience associated with a social networking system can be enhanced as the social networking system becomes more knowledgeable about the users that it serves. When knowledge of a user is gained, content, advertising, and other services can be optimized for presentation to the user. Such potentially helpful knowledge about the user can include information about the user as an individual as well as the user's activity on the social network. Knowledge about the user can be utilized to provide features that increase user interest in and engagement with the social networking system.

SUMMARY

Various embodiments of the present disclosure can include systems, methods, and non-transitory computer readable media configured to receive an image. One or more concepts depicted in the image are identified based on machine learning techniques. The one or more concepts are filtered based on filtering criteria to identify one or more selected concepts. An image description is generated comprising the one or more selected concepts.

In an embodiment, each concept of the one or more concepts is assigned a confidence score indicative of a likelihood that the concept is depicted in the image.

In an embodiment, the filtering criteria comprises one or more confidence score thresholds.

In an embodiment, the filtering the one or more concepts comprises, for each concept of the one or more concepts, querying a whitelist comprising a plurality of concepts and a plurality of confidence score thresholds to determine a confidence score threshold associated with the concept; and determining whether the confidence score assigned to the concept satisfies the confidence score threshold.

In an embodiment, the filtering the one or more concepts comprises excluding from the one or more selected concepts any concepts of the one or more concepts that are not listed in the whitelist.

In an embodiment, the image description is embedded in the image as alternative text.

In an embodiment, the machine learning techniques comprise at least one of object recognition machine learning techniques or facial recognition machine learning techniques.

In an embodiment, the identifying one or more concepts further comprises identifying one or more concepts based on optical character recognition techniques.

In an embodiment, the image description is presented to a user and a request for additional information about the image is received.

In an embodiment, responsive to receiving the request for additional information about the image, additional image information is presented. The additional image information comprises at least one concept of the one or more concepts that was not included in the one or more selected concepts.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Image Description Generation

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

User experience associated with a social networking system can be enhanced as the social networking system becomes more knowledgeable about the users that it serves. When knowledge of a user is gained, content, advertising, and other services can be optimized for presentation to the user. Such potentially helpful knowledge about the user can include information about the user as an individual as well as the user's activity on the social network. Knowledge about the user can be utilized to provide features that increase user interest in and engagement with the social networking system.

Social networking systems serve a diverse group of users with different interests and experiences. Users of a social networking system, or potential users of a social networking system, will include users with physical impairments. Certain physical impairments, such as blindness, can affect the way that users are able to interact with the social networking system. It continues to be an important interest for a social networking system rooted in computer technology to provide users who are unable to effectively utilize traditional user interfaces with tools and features that enable those users to interact and engage with other users and content on the social networking system. However, it can be a challenge to provide users with visual impairments with interfaces and features that will maximize their experience on the social networking system. This is particularly true given that some of the most popular elements of a social networking system experience may be rooted in visual elements, such as interacting with images or videos posted to the social networking system by other users. For certain social networking systems, users may post billions of images a day to the social networking system, and an important aspect of engagement on a social networking system is engaging with content posted to the social networking system by others. As such, it is an important interest for social networking systems to provide visually impaired users with access to these aspects of the social networking system.

Therefore, an improved approach can be beneficial for overcoming these and other disadvantages associated with conventional approaches. Based on computer technology, the disclosed technology can automatically generate descriptions of images posted to the social networking system. Image descriptions can then be provided to visually impaired users (e.g., by being read audibly by a screen reader). In certain embodiments, concepts in an image can be identified using automatic concept identification techniques. For example, in various embodiments, object concepts may be detected using object recognition machine learning techniques, facial concepts may be detected using facial recognition machine learning techniques, and text-based concepts may be detected using optical character recognition (OCR) techniques. Each concept detected in an image may be assigned a confidence score (e.g., a value between 0 and 1) indicative of the likelihood that the concept is depicted in the image. Certain concepts satisfying a confidence score threshold can be selected for inclusion in an image description, and the image description can be provided to the user.

Figure 1:
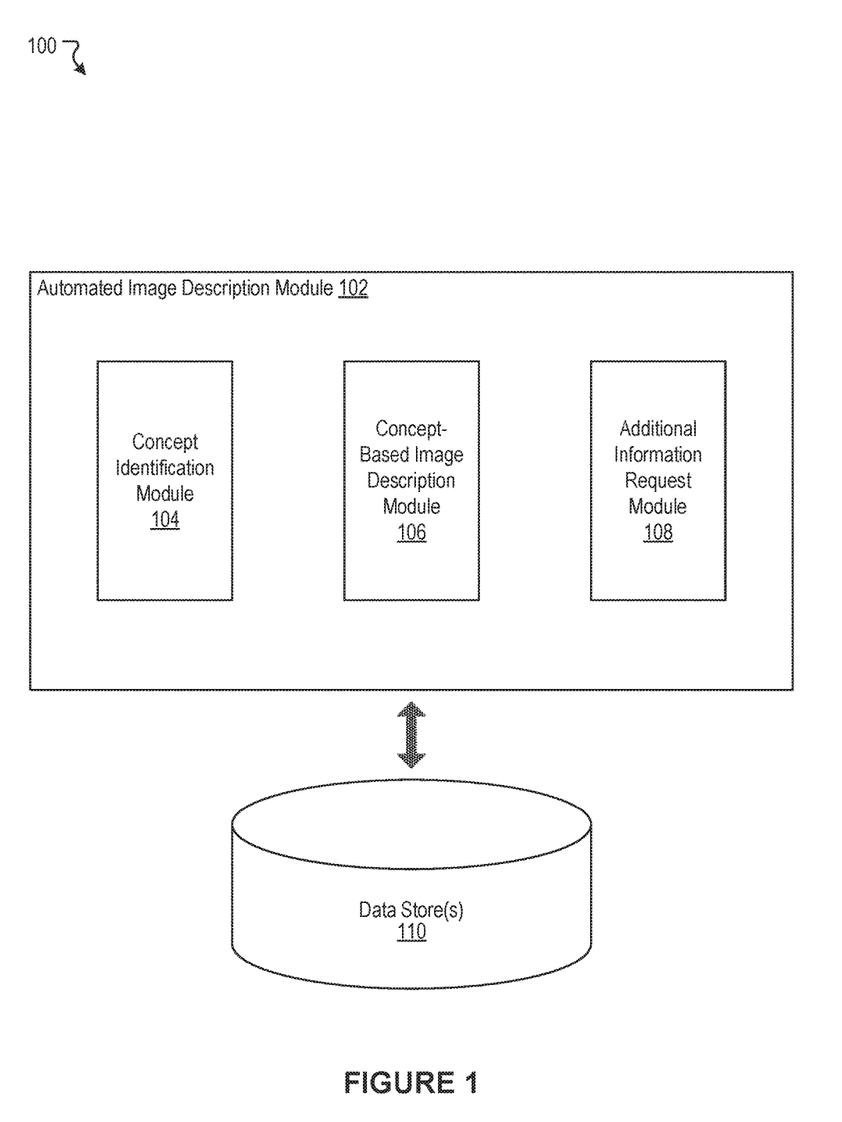
FIG. 1 illustrates an example system including an automated image description module, according to an embodiment of the present disclosure.

FIG. 1 illustrates an example system 100 including an example automated image description module 102 configured to automatically generate image descriptions, according to an embodiment of the present disclosure. For example, image descriptions can be generated for images posted to a social networking system. The automated image description module 102 can be configured to identify one or more concepts depicted in an image using various automatic concept identification techniques. In various embodiments, object concepts, facial concepts, and/or text-based concepts can be identified in the image based on automated techniques (e.g., machine learning techniques, OCR techniques). Object concepts can include any terms and/or phrases that can be used to describe the contents of an image. For example, object concepts can include nouns, actions, setting descriptors, and/or composition descriptors. Facial concepts can include any concepts based on detection of faces, such as the number of faces present in an image, facial features that can identify users, and/or facial characteristics (e.g., whether a person is smiling or frowning, or wearing glasses, etc.). Text-based concepts can include text that is depicted in an image, as well as various characteristics of any text depicted. Each concept detected in an image may be assigned a confidence score indicative of the likelihood that the concept is depicted in the image. Certain concepts can be filtered out, and other concepts selected for inclusion in the image description, based on confidence scores and confidence score thresholds. An image description can be generated based on identified concepts that satisfy one or more confidence score thresholds, and the image description can be provided to a user. In certain embodiments, once a user is provided with an image description, the user may be provided with the ability to request additional information about the image.

As shown in the example of FIG. 1, the automated image description module 102 can include a concept identification module 104, a concept-based image description module 106, and an additional information request module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The automated image description module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the automated image description module 102 can be implemented, in part or in whole, as software running on one or more computing devices or systems, such as on a server computing system or a user (or client) computing system. For example, the automated image description module 102 or at least a portion thereof can be implemented as or within an application (e.g., app), a program, or an applet, etc., running on a user computing device or a client computing system, such as the user device 610 of FIG. 6. In another example, the automated image description module 102 or at least a portion thereof can be implemented using one or more computing devices or systems that include one or more servers, such as network servers or cloud servers. In some instances, the automated image description module 102 can, in part or in whole, be implemented within or configured to operate in conjunction with a social networking system (or service), such as the social networking system 630 of FIG. 6. It should be understood that there can be many variations or other possibilities.

The automated image description module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the automated image description module 102. For example, the data store 110 can store various object recognition machine learning models, facial recognition machine learning models, OCR models, image descriptions, a whitelist of concepts and associated confidence score thresholds, and the like, as described in greater detail herein. It is contemplated that there can be many variations or other possibilities.

The concept identification module 104 can be configured to identify one or more concepts depicted in an image. The image may be an image posted to a social networking system. In various embodiments, concepts in an image may be identified using one or more automated techniques. For example, concepts in an image can be automatically identified using objection recognition machine learning techniques, facial recognition machine learning techniques, and/or OCR techniques. Each concept identified in an image can be assigned a confidence score indicative of the likelihood that the concept is depicted in the image. Functionality of the concept identification module 104 is described in greater detail herein with reference to FIG. 2.

The concept-based image description module 106 can be configured to generate an image description based on the concepts identified by the concept identification module 104. In certain embodiments, certain concepts identified by the concept identification module 104 may be filtered out based on confidence scores and confidence score thresholds. Each concept identified by the concept identification module 104 can have its associated confidence score compared to a confidence score threshold to determine whether or not the concept should be included in the image description. Any concepts for which the confidence score exceeds a confidence score threshold can be selected for inclusion in the image description and the image description can be generated using the selected concepts. The image description can then be provided (e.g., by being read audibly by a screen reader) when a user is presented with the image. Functionality of the concept-based image description module 106 is described in greater detail herein with reference to FIG. 3.

The additional information request module 108 can be configured to allow a user to request additional information about an image. As described above, when a visually impaired user comes across an image posted to a social networking system, the user may be provided with an image description generated for and associated with that image. If the user would like additional information about the image, the user may request additional information. For example, in certain embodiments, users may be able to request additional image information that is available to the social networking system. This additional image information may include information that is known to the social networking system but was not selected for inclusion in the image description for one reason or another. For example, additional image information can include one or more concepts identified by the concept identification module 104 that were not selected for inclusion in the image description for one reason or another. For example, the image description may state that a dog is depicted in the picture. However, for the sake of providing a brief, concise image description, additional descriptors of the dog, while having been identified by the automated concept identification techniques, may not be included in the image description, such as the dog's breed, or color, or size, etc. The user can request that the social networking system provide additional information about the dog (e.g., by asking, "What color is the dog?"), and the social networking system can respond using any additional information available.

In certain embodiments, users may be provided with the ability to ask other users for additional information about an image. For example, the user may be provided with an interface in which the user, once he or she has received an image description, can ask for additional information by sending a message to the user that posted the image to the social networking system. In another example, the user can send a message to one or more of the user's connections on the social networking system requesting additional information about the image. In yet another example, the user can publish a public request on the social networking system requesting any users on the social networking system to provide additional information about the image.

Figure 2:
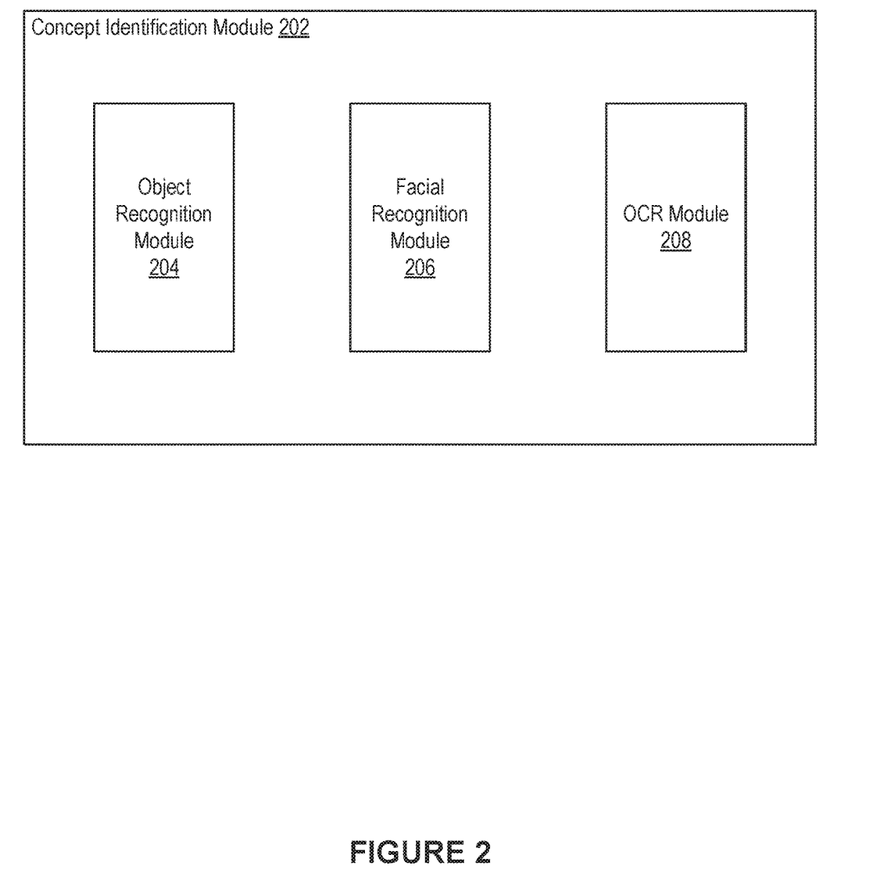
FIG. 2 illustrates an example concept identification module, according to an embodiment of the present disclosure.

FIG. 2 illustrates an example concept identification module 202 configured to identify one or more concepts depicted in an image, according to an embodiment of the present disclosure. In some embodiments, the concept identification module 104 of FIG. 1 can be implemented as the example concept identification module 202. As shown in FIG. 2, the concept identification module 202 can include an object recognition module 204, a facial recognition module 206, and an OCR module 208.

The object recognition module 204 can be configured to identify one or more object concepts depicted in an image. As discussed above, object concepts can include any terms and/or phrases that can be used to describe the contents of an image. For example, object concepts can include nouns (e.g., tree, rock, grass, sky, dog, car), actions (e.g., running, jumping), setting descriptors (e.g., indoors, outdoors, room), and/or composition descriptors (e.g., panorama, close-up). In certain embodiments, object concepts can be identified using object recognition machine learning techniques. Each object concept identified in the image can be assigned a confidence score indicative of the likelihood that the object concept is depicted in the image.

The facial recognition module 206 can be configured to identify one or more facial concepts depicted in an image. In certain embodiments, facial concepts can be identified using facial recognition machine learning techniques. As discussed above, facial concepts can include any concepts based on detection of faces. Facial concepts can include, for example, the number of faces depicted in an image, facial features that can identify users, and/or facial characteristic information (e.g., for each face, a determination as to whether a person is smiling, or frowning, or wearing glasses, etc.). Each face detected in an image can have a face detection confidence score indicative of the likelihood that the detected face is actually a depiction of a face. The number of faces depicted in an image can be determined based on face detection confidence scores (e.g., each detected face that has a face detection confidence score above a threshold can be counted as one face depicted in the image). Furthermore, each face detected in an image can include one or more facial characteristics. For example, facial characteristics can include, for each face, a user ID (e.g., identification of a user on a social networking system based on facial recognition), facial expression characteristics (e.g., whether the face is smiling, whether the face is frowning, etc.), facial descriptors (e.g., whether the face is a child face, whether the face is an adult face, eye color, whether the face has glasses, a beard, a mustache, etc.). Each facial characteristic can correspond to a facial concept, and each facial concept can be assigned its own confidence score. For example, if a face is detected in an image, and it is detected that the face may be the face a user named John Doe, that the face may be smiling, and that the face may have glasses, each characteristic (user ID, smiling, glasses) can be assigned a confidence score indicative of the likelihood that the characteristic is true (e.g., likelihood that the face is the user John Doe, likelihood the face is smiling, likelihood the face has glasses). Each of these confidence scores can be used later on to determine which facial concepts to include in an image description.

The OCR module 208 can be configured to identify one or more text-based concepts depicted in an image. Text-based concepts can be identified using OCR techniques. Text-based concepts can include, for example, the presence of text in an image, the content of any text depicted in an image, and any other characteristics of text depicted in an image (e.g., position of text, orientation, font, size, color, etc.). In certain embodiments, each letter, each word, and/or each collection of words identified in an image can be assigned a confidence score.

While various "types" of concepts (e.g., object concept, facial concept, text-based concept) have been discussed, it should be understood that such description is provided only to aid in understanding, and differentiation of concept "types" is not necessary to fall within the scope of the present disclosure. Similarly, while three distinct modules have been described for identification of three different "types" of concepts, this is simply an example implementation, and it should be understood that the present disclosure can be understood to be implemented in other configurations. For example, concept identification can be performed in fewer parts, or can be broken down into a greater number of elements than that shown in the example implementation of FIG. 2.

Figure 3:
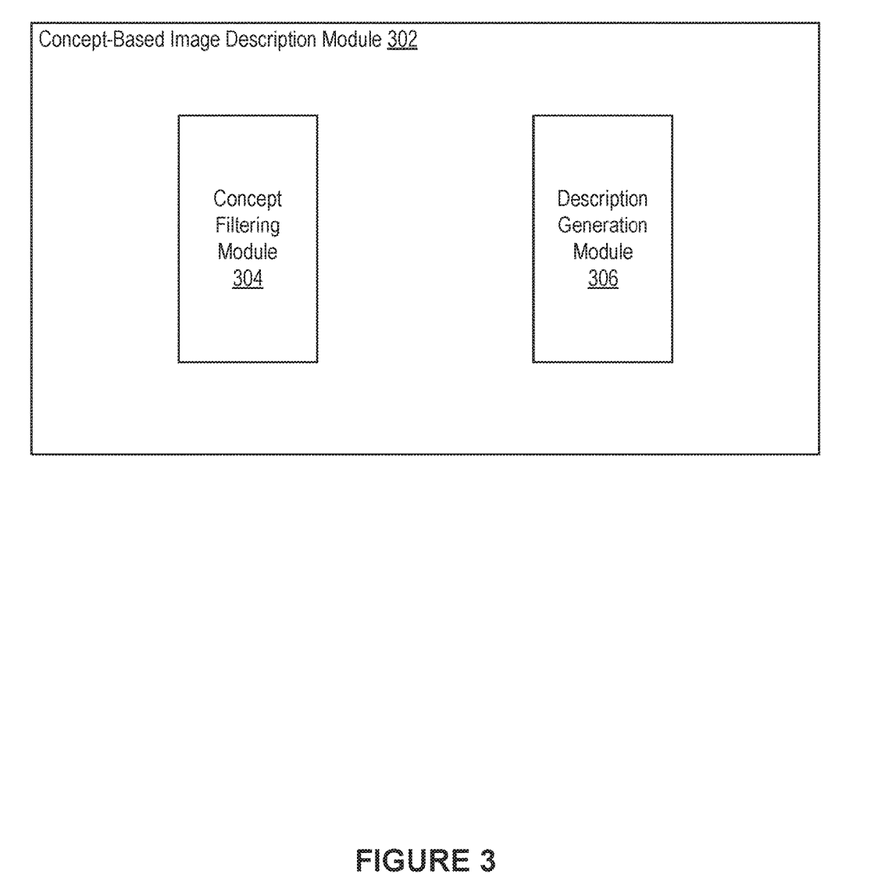
FIG. 3 illustrates an example concept-based image description module, according to an embodiment of the present disclosure.

FIG. 3 illustrates an example concept-based image description module 302 configured to generate an image description based on one or more concepts identified in the image, according to an embodiment of the present disclosure. In some embodiments, the concept-based image description module 106 of FIG. 1 can be implemented as the example concept-based image description module 302. As shown in FIG. 3, the concept-based image description module 302 can include a concept filtering module 304 and a description generation module 306.

The concept filtering module 304 can be configured to filter concepts based on filtering criteria. In certain embodiments, filtering criteria can include confidence score thresholds. As discussed above, an image can be analyzed (e.g., by the concept identification module 202 of FIG. 2) to identify one or more concepts that may be depicted in the image. Each concept can be assigned a confidence score. Concepts can be filtered out based on confidence scores and confidence score thresholds, and any remaining concepts can be selected for inclusion in an image description. In certain embodiments, various concepts can have associated confidence score thresholds. In other words, confidence score thresholds can differ for different concepts. For example, the concept of an "apple" may require a confidence score of at least 0.7 to be included in an image description, while the concept of a "face" may require a confidence score of 0.8 to be included in an image description, and the concept of "smiling" may require a confidence score of at least 0.9 to be included in an image description. The concept filtering module 304 can implement a whitelist comprising a plurality of concepts, and each concept is associated with a confidence score threshold.

In certain embodiments, certain concepts may be excluded from an image description regardless of confidence score. For example, object recognition machine learning models may be trained to identify whether a landmark is depicted in an image. However, the generic term "landmark" may be determined to be unhelpful in an image description. As such, even if a landmark is identified in an image, and even if the confidence score is very high (e.g., a perfect 1.0), the concept "landmark" may be excluded based on the fact that it is not a helpful descriptor in an image description. This feature may be implemented by excluding certain concepts from the whitelist. Since these concepts are excluded from the whitelist, these concepts do not have an associated confidence score threshold listed in the whitelist and are not selected as concepts for inclusion in an image description in some embodiments.

As described above, for text-based concepts, one or more words may be grouped together, and each word may have a confidence score associated with it. In certain embodiments, if one word in a grouping of text has text that falls below a text-based confidence score threshold (i.e., the contents of that word are not reasonably certain), the contents of the text may be excluded from the image description.

In certain embodiments, multiple concept identification modules and/or techniques may identify overlapping, or duplicate concepts. For example, an object recognition module may identify faces and/or people in an image, which may also be identified by a facial recognition module. To address this issue, and to ensure that each concept is included only one time in an image description, the concept filtering module 304 can be configured to filter out duplicate concepts that are redundant of one another. In certain embodiments, the concept filtering module 304 can be configured to select one concept from a plurality of duplicate concepts based on duplicate concept selection criteria. For example, the duplicate concept selection criteria can select one concept from a plurality of duplicate concepts based on which duplicate concept has more information available. Consider an example scenario in which an object recognition module identifies that there are people present in an image, while a facial recognition module identifies that there are three people in an image, and that two of them are smiling. In this case, the concepts identified by the facial recognition module include more information, and, as such, are selected for potential inclusion in an image description.

The description generation module 306 can be configured to generate an image description based on concepts identified in the image. In certain embodiments, any concepts that are selected by the concept filtering module 304 (i.e., not filtered out by the concept filtering module) can be included in the image description. In certain embodiments, concepts may be listed in an image description in a predetermined order based on concept type. For example, an image description could include all object concepts, followed by a number of faces detected (if any), followed by any facial concepts, and followed by text-based concepts. Text-based concepts included in an image description may include simply an indication that there is text in an image, or a recital of the actual contents of the text depicted in the image. For example, an image description may read "This image may contain: sky, water, outdoor, three people, smiling, with text that says, Welcome to Hawaii."

In certain embodiments, an image description, once generated, may be embedded in an image (or image file or image element). For example, the image description can be embedded in an image as alternative text (also known as an "alt attribute" or an "alt tag") so that the image description can be read by a screen reader for a visually impaired user. When a visually impaired user comes across an image, a screen reader can automatically read the image description embedded in the image.

Figure 4:
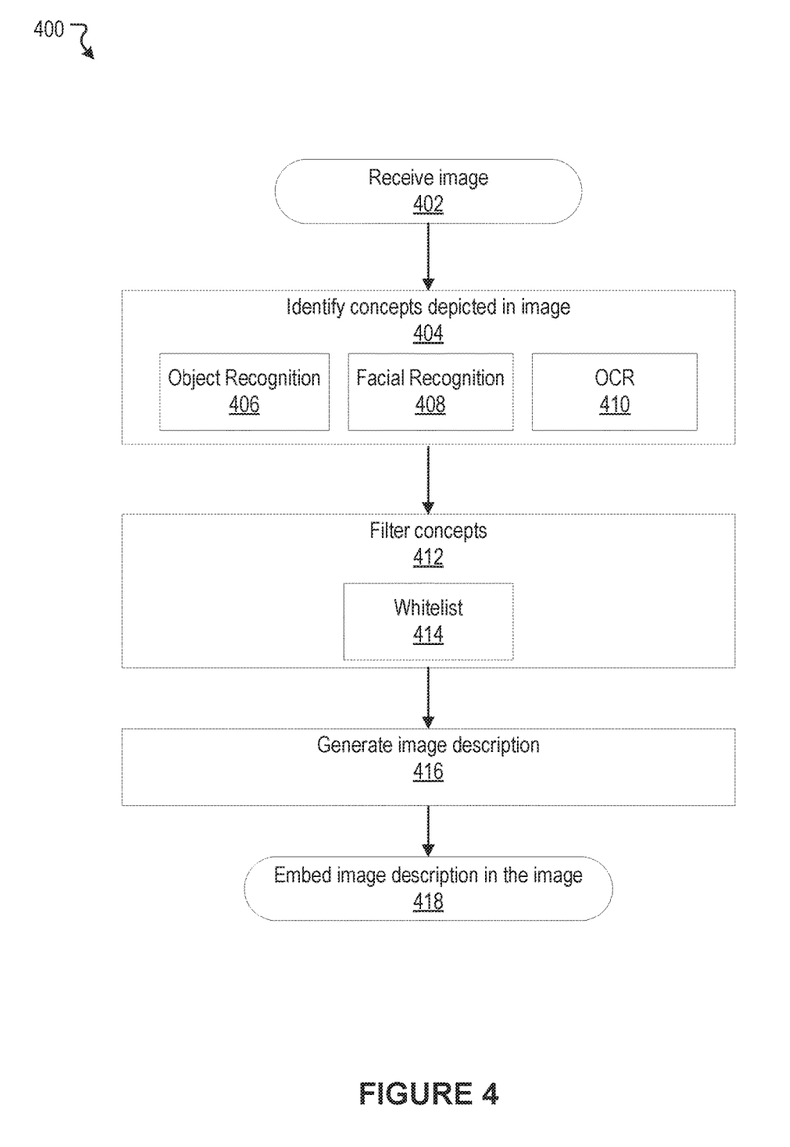
FIG. 4 illustrates an example functional block diagram associated with automatic image description generation, according to an embodiment of the present disclosure.

FIG. 4 illustrates an example functional block diagram 400 associated with automatic generation of image descriptions, according to an embodiment of the present disclosure. At block 402, an image is received. This may include, for example, an image posted to a social networking system by a user. At block 404, concepts are identified in the image. Concepts may be identified based on object recognition techniques (block 406), facial recognition techniques (block 408), and/or OCR techniques (block 410), to name a few examples. At block 412, any identified concepts can then be filtered, for example, using confidence scores and confidence score thresholds. Confidence score thresholds for various concepts may be stored in a whitelist (block 414). Any concepts that have not been filtered out can be included in an image description. At block 416, an image description is generated, and at block 418, the image description is embedded in (or associated with) the image.

Figure 5:
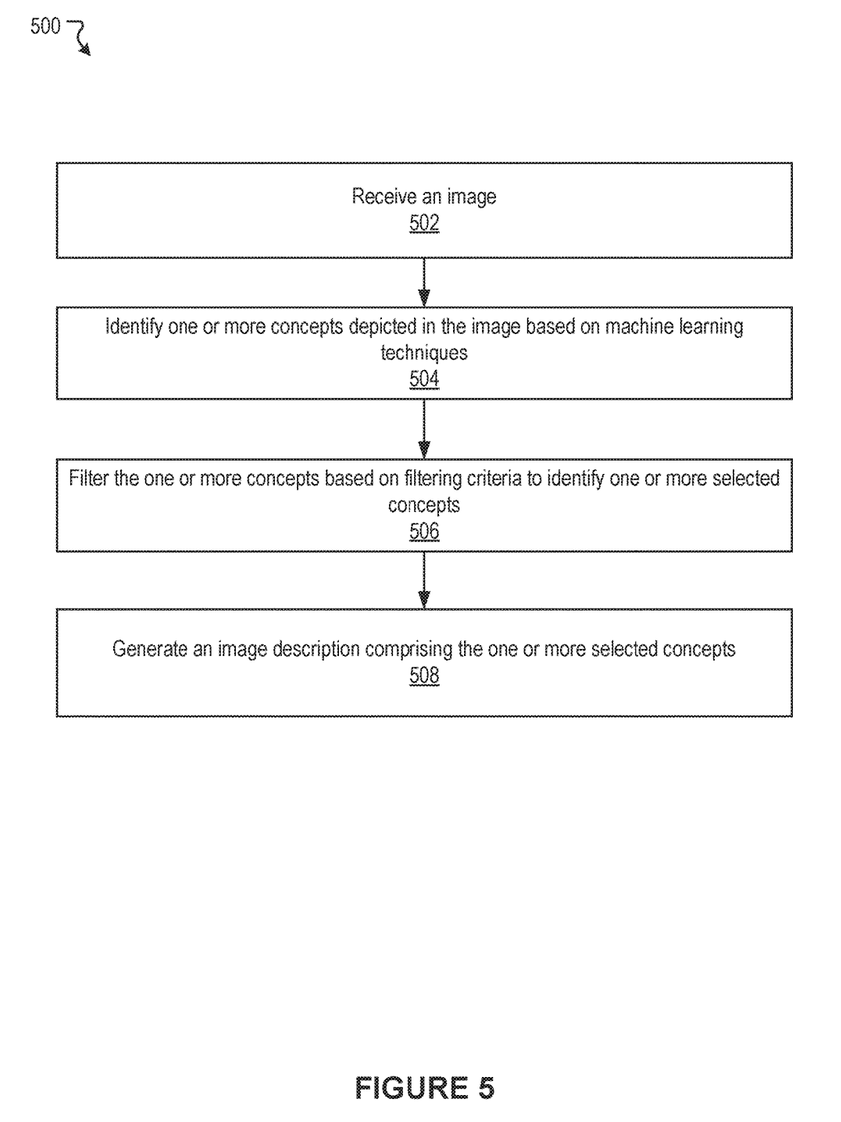
FIG. 5 illustrates an example method associated with automatic image description generation, according to an embodiment of the present disclosure.

FIG. 5 illustrates an example method 500 associated with automated image description generation, according to an embodiment of the present disclosure. It should be appreciated that there can be additional, fewer, or alternative steps performed in similar or alternative orders, or in parallel, based on the various features and embodiments discussed herein unless otherwise stated.

At block 502, the example method 500 can receive an image. At block 504, the example method 500 can identify one or more concepts depicted in the image based on machine learning techniques. At block 506, the example method 500 can filter the one or more concepts based on filtering criteria to identify one or more selected concepts. At block 508, the example method 500 can generate an image description comprising the one or more selected concepts. Other suitable techniques that incorporate various features and embodiments of the present technology are possible.

It is contemplated that there can be many other uses, applications, features, possibilities, and variations associated with various embodiments of the present technology. For example, users can choose whether or not to opt-in to utilize the present technology. The present technology also can ensure that various privacy settings, preferences, and configurations are maintained and can prevent private information from being divulged. In another example, various embodiments of the present technology can learn, improve, and be refined over time.

Social Networking System—Example Implementation

Figure 6:
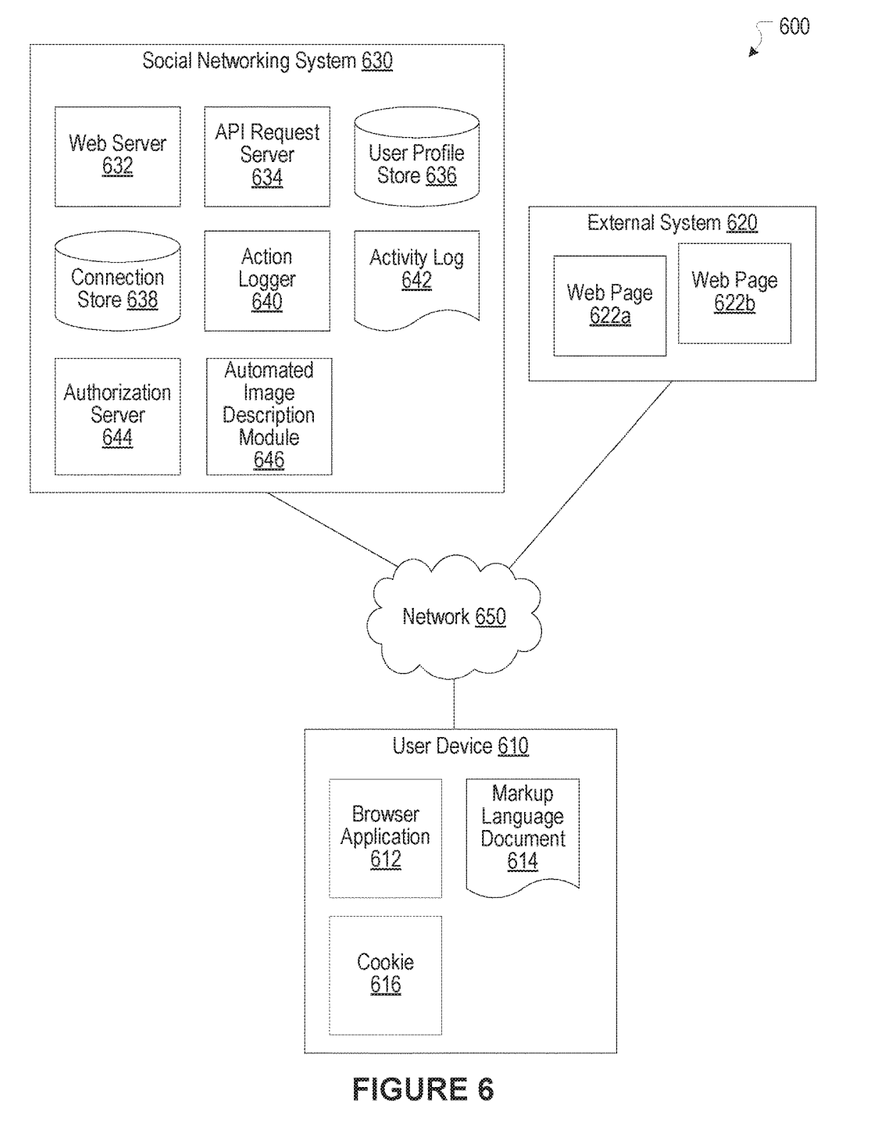
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and provides users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an automated image description module 646. The automated image description module 646 can, for example, be implemented as the automated image description module 102, as discussed in more detail herein. As discussed previously, it should be appreciated that there can be many variations or other possibilities. For example, in some embodiments, one or more functionalities of the automated image description module 646 can be implemented in the user device 610.

Hardware Implementation

Figure 7:
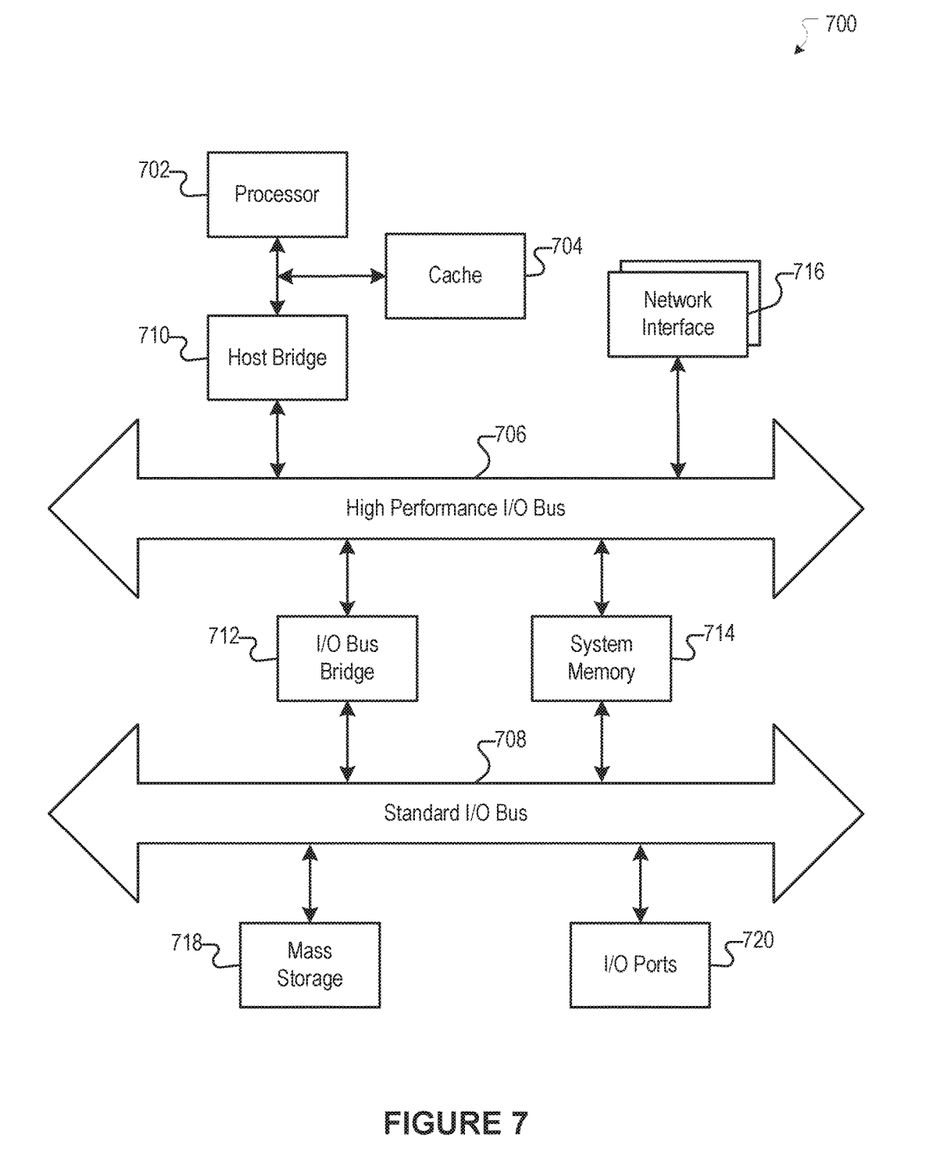
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, an image;
   identifying, by the computing system, one or more concepts depicted in the image based on machine learning techniques;
   filtering, by the computing system, the one or more concepts based on filtering criteria to identify one or more selected concepts;
   generating, by the computing system, an image description comprising the one or more selected concepts; and
   providing, by the computing system, the image description for presentation to a user.

2. The computer-implemented method of claim 1, further comprising:
   assigning each concept of the one or more concepts a confidence score indicative of a likelihood that the concept is depicted in the image.

3. The computer-implemented method of claim 2, wherein the filtering criteria comprises one or more confidence score thresholds.

4. The computer-implemented method of claim 3, wherein the filtering the one or more concepts comprises:
   for each concept of the one or more concepts,
   querying a whitelist comprising a plurality of concepts and a plurality of confidence score thresholds to determine a confidence score threshold associated with the concept; and
   determining whether the confidence score assigned to the concept satisfies the confidence score threshold.

5. The computer-implemented method of claim 4, wherein the filtering the one or more concepts comprises excluding from the one or more selected concepts any concepts of the one or more concepts that are not listed in the whitelist.

6. The computer-implemented method of claim 1, further comprising embedding the image description in the image as alternative text.

7. The computer-implemented method of claim 1, wherein the identifying one or more concepts further comprises identifying one or more concepts based on optical character recognition techniques.

8. The computer-implemented method of claim 1, further comprising
   receiving a request for additional information about the image.

9. The computer-implemented method of claim 8, further comprising, responsive to receiving the request for additional about the image, presenting additional image information, wherein the additional image information comprises at least one concept of the one or more concepts that was not included in the one or more selected concepts.

10. The computer-implemented method of claim 1, wherein the providing the image description for presentation to the user comprises providing the image description for audible presentation to the user.

11. A system comprising:
    at least one processor; and
    a memory storing instructions that, when executed by the at least one processor, cause the system to perform a method comprising:
    receiving an image;
    identifying one or more concepts depicted in the image based on machine learning techniques;
    filtering the one or more concepts based on filtering criteria to identify one or more selected concepts;
    generating an image description comprising the one or more selected concepts; and
    providing the image description for presentation to a user.

12. The system of claim 11, wherein the method further comprises:
    assigning each concept of the one or more concepts a confidence score indicative of a likelihood that the concept is depicted in the image.

13. The system of claim 12, wherein the filtering criteria comprises one or more confidence score thresholds.

14. The system of claim 13, wherein the filtering the one or more concepts comprises:
    for each concept of the one or more concepts,
    querying a whitelist comprising a plurality of concepts and a plurality of confidence score thresholds to determine a confidence score threshold associated with the concept; and
    determining whether the confidence score assigned to the concept satisfies the confidence score threshold.

15. The system of claim 14, wherein the filtering the one or more concepts comprises excluding from the one or more selected concepts any concepts of the one or more concepts that are not listed in the whitelist.

16. A non-transitory computer-readable storage medium including instructions that, when executed by at least one processor of a computing system, cause the computing system to perform a method comprising:
  receiving an image;
  identifying one or more concepts depicted in the image based on machine learning techniques;
  filtering the one or more concepts based on filtering criteria to identify one or more selected concepts;
  generating an image description comprising the one or more selected concepts; and
  providing the image description for presentation to a user.

17. The non-transitory computer-readable storage medium of claim 16, wherein the method further comprises:
  assigning each concept of the one or more concepts a confidence score indicative of a likelihood that the concept is depicted in the image.

18. The non-transitory computer-readable storage medium of claim 17, wherein the filtering criteria comprises one or more confidence score thresholds.

19. The non-transitory computer-readable storage medium of claim 18, wherein the filtering the one or more concepts comprises:
  for each concept of the one or more concepts,
  querying a whitelist comprising a plurality of concepts and a plurality of confidence score thresholds to determine a confidence score threshold associated with the concept; and
  determining whether the confidence score assigned to the concept satisfies the confidence score threshold.

20. The non-transitory computer-readable storage medium of claim 19, wherein the filtering the one or more concepts comprises excluding from the one or more selected concepts any concepts of the one or more concepts that are not listed in the whitelist.

* * * * *